April 23, 1929.  A. FURRER  1,710,614
TIRE RIM
Filed March 26, 1926   2 Sheets-Sheet 1
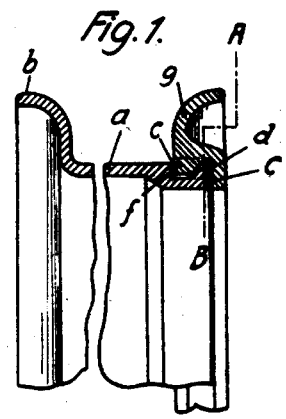
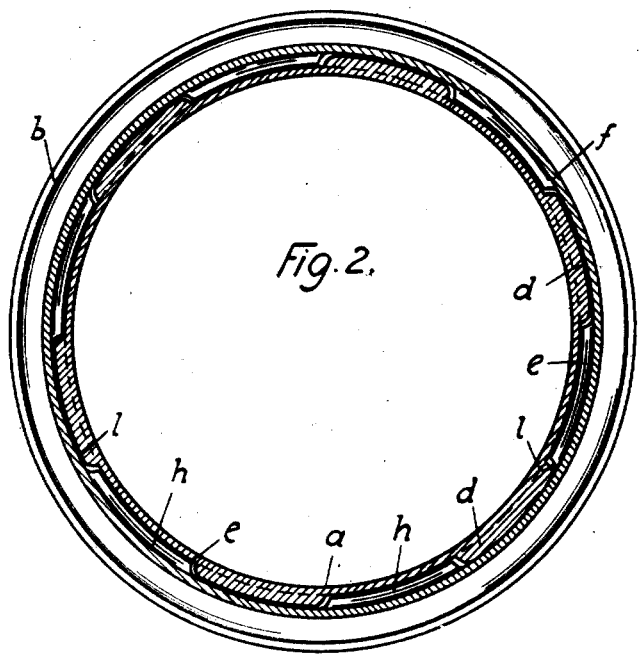
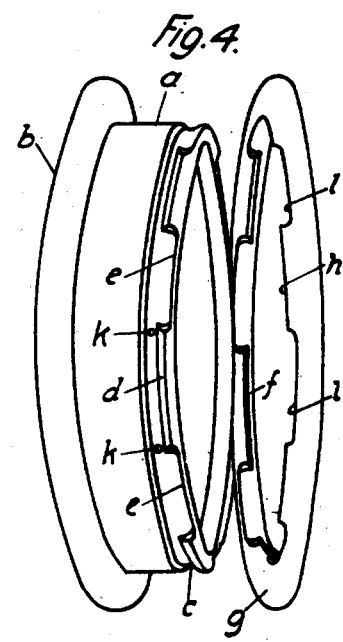
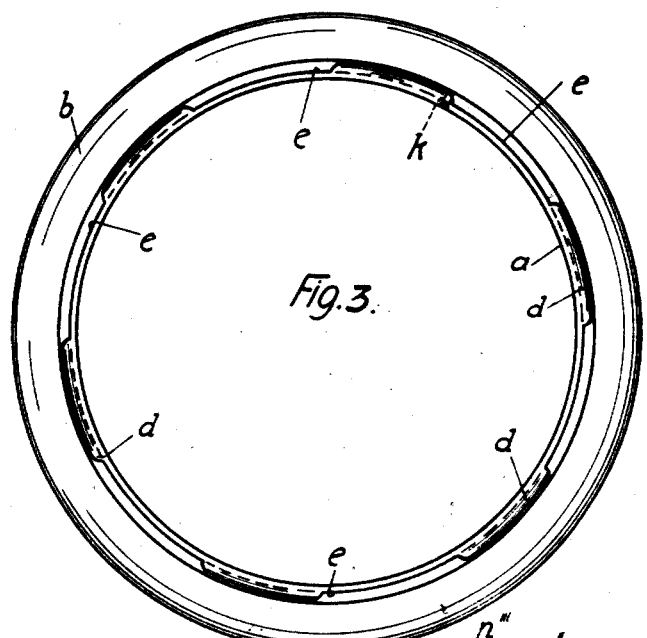
Inventor:
Albert Furrer

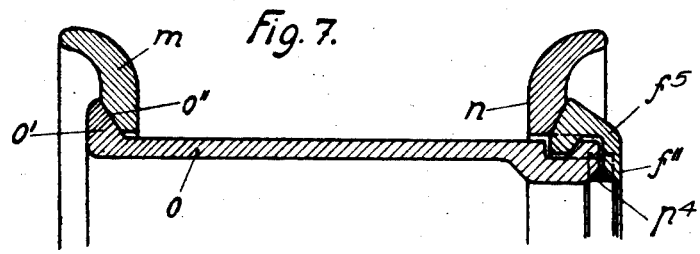
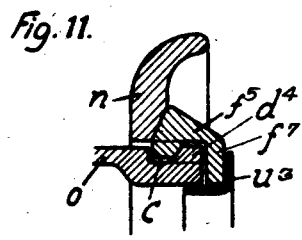
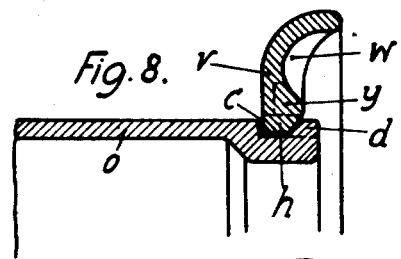
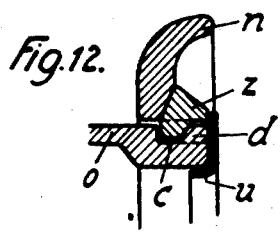
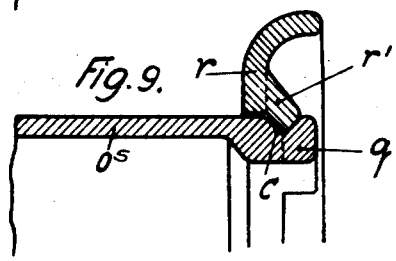
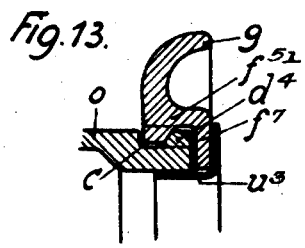
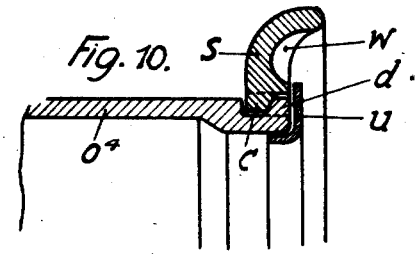
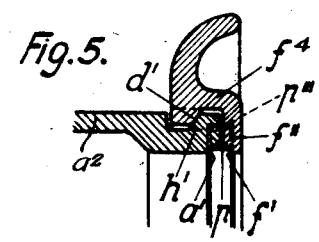

Patented Apr. 23, 1929.

1,710,614

UNITED STATES PATENT OFFICE.

ALBERT FURRER, OF ZURICH, SWITZERLAND.

TIRE RIM.

Application filed March 26, 1926, Serial No. 97,569, and in Germany April 1, 1925.

The present invention relates to rims and more particularly to circumferentially split detachable rims for pneumatic tires of motor vehicles.

The main object of the invention is to provide a rim of an improved construction which facilitates the mounting and dismounting of the tires and which shall be simple, strong and durable in construction. A further object of the invention is to provide a rim with a ring member adapted to be fixed to the felloe and with a second ring member forming a detachable side flange, the members being provided with projections and recesses which interengage to hold the two ring members together.

Other objects of the invention relate to the provision of minor parts co-operating with the elements above noted and to details of construction, all of which will be more clearly set forth in the following specification.

With the above objects in view the invention resides in the parts and combination of parts hereinafter described, and particularly set forth in the claims appended hereto.

In the accompanying drawings several forms of construction are shown by way of examples.

Fig. 1 is a cross-section through a part of the rim,

Fig. 2 is a section on line A—B of Fig. 1.

Fig. 3 is a side view of the rim member $a$,

Fig. 4 is a perspective of the rim, disassembled,

Fig. 5 illustrates on a larger scale a part of the rim in section according to a modification or the invention, Fig. 6 illustrates in a side view a part of the rim in section according to such modification;

Figs. 7 to 13 show each in a cross section a further modified construction of the rim with the parts assembled.

The rim shown in Figs. 1 to 6 comprises a ring $a$ with side flange $b$ adapted to be fixed to the felloe of a vehicle wheel or to the spokes thereof by means not shown in the drawing. The ring $a$ is provided with a circumferential groove $c$. At the outer side of said groove $c$ a ridge $d$ is formed having notches or recesses $e$ of equal size and at equal distances apart from each other and reaching to the base of the groove $c$. The rim comprises further a detachable side flange $f$ having projections $h$ and recesses $l$ corresponding in size and number to the recesses $e$ and projections $d$ of the ring $a$. The side flange $f$ may be fitted to the ring $a$ by passing the projections $h$ through the recesses $e$ and by partly turning the side flange $f$ circumferentially, the projections $h$ passing in the groove $c$ are brought behind the projections $d$ of ring $a$, the two parts $a$ and $f$ being interlocked. The part $f$ is provided with an outwardly projecting flange $g$. Between the flanges $b$ and $g$ the casing of a pneumatic tire is held; the casing pressing on said flanges $b$ and $g$ keeps the side flange $f$ firmly on the ring $a$. The abutting faces $d'$ and $h'$ of the projections $d$ and $h$ are bevelled. The side flange $f$ is provided with considerable radial play, its interior diameter being somewhat greater than the exterior diameter of the rim $a$. If the pneumatic tire expands the casing which may be an armored casing it presses the flanges $b$, $g$ apart and the side flange member $f$ assumes under the pressure exerted by the tire a position truly concentric with the ring member $a^2$. Friction between the tire casing and the flanges $b$, $g$, retains the flange member $f$ in place. To further retain the parts $a$ and $f^4$ in their locking position and in accordance with a modification of the invention as shown in Fig. 5, a split spring ring $p$ may be provided which is arranged in a groove formed by the adjacent walls $a'$ and $f''$ of the ring $a^2$ and of an inwardly projecting flange $f''$ of the side flange $f^4$. The ends $p'$, $p''$ of the split ring $p$ (Fig. 6) are bent outwardly and engage recesses $p'''$ provided in the ring $a^2$ and the side flange $f^4$. The split ring $p$ closes the gap between the parts $a^2$ and $f^4$ preventing the access of water and dirt into the joint and moreover locks the side flange $f^4$, in its position on the rim $a^2$.

It is a well known fact that the covers of the pneumatic tires adhere very firmly to the metal parts of the rim and a dismounting of a tire presents often very considerable difficulties. To get the tire loose without hard manual work or without auxiliary devices or tools the split ring $p$ is removed and the car is run under load for a distance. The side flange $f$ having radial play as before stated works loose under the strain of the tire and may be removed without difficulty.

Screws $k$ are provided to secure the side flange $f$ in its locking position, in the form of the invention shown in Figs. 1 to 4. The means to fit the ring *a* to a felloe are not shown and may be made in any well known manner.

As shown in Fig. 7 the flanges embracing the tire casing may be made as separate members. The annular member *o* which in practice is attached to the felloe of a vehicle wheel is provided with an outwardly projecting ridge *o'* having a bevelled face *o''* on which a side flange *m* rests. The side flange comprises two parts, the locking ring $f^4$ being constructed and operating as described above and the side flange ring *n* for mounting or dismounting the ring $f^5$ is not in contact with the rubber and runs on metal faces only. It can therefore be moved easily in and out of its locking position.

Fig. 8 shows a modified construction. The annular, tire-carrying member *o* is provided with the groove *c* and the projections *d*. The removable side flange *v* having the projections *h* (engaging the projections *d*) is provided with bores *y* and ribs *w* by means of which the side flange *v* may be turned by a suitable tool.

The projections on the ring $o^5$ may be made as shown in Fig. 9. The projections *q* extend in axial direction and the removable side flange *r* is provided with sidewardly protruding projections *r'* engaging the projections *q*. The side flange *r* is fitted on the rim $o^5$ in the same manner as described with reference to Figs. 1 to 4.

To close the gap between the side flange *s* and the ring $o^4$ (as shown in Fig. 10) a ring *u* of sheet metal may be used which may be fixed to the ring *o*. Dirt, etc., are prevented from getting into the gap in larger quantities.

Figs. 11 to 13 show different shapes of the protecting sheet metal ring *u*, the shape of which alters with the position of the gap.

The flange $f^7$ shown in Fig. 11 may be done away with as shown in Fig. 12 and one shank of the protective ring *u* running in radial direction is close to the outer faces of the projections *d*.

Fig. 13 illustrates the form of the ring $u^3$ in connection with the removable side flange $f^{51}$ having a flange $f^7$ projecting inwardly. The gap is well closed and no dirt can collect in the gap which on hardening would increase the difficulties to remove the side flange $f^{51}$.

What I wish to secure by U. S. Letters Patent is:

1. A rim for vehicle wheels comprising in combination a ring adapted to be fixed to the wheel body, a radially projecting flange running along one of the edges of said ring, a groove running along the other edge of said ring, projections arranged along the second said edge at equal distances apart, a side flange, inwardly protruding projections on said side flange, engaging the projections of the said ring, said side flange having play on the ring in radial direction the contacting faces of ring and side flange being bevelled, a split spring ring being provided to close the gap between the ring and the side flange.

2. A rim for vehicle wheels comprising in combination a ring adapted to be fixed to the wheel body, a radially projecting flange running along one of the edges of said ring, a groove running along the other edge of said ring, projections arranged along the second said edge at equal distances apart, a side flange, inwardly protruding projections on said side flange engaging the projections of the said ring, said side flange having play on the ring in radial direction, the contacting faces of ring and side flange being bevelled, a split spring ring being provided to close the gap between the ring and the side flange, said split ring being provided with noses engaging cavities of ring and side flange and locking these parts in their relative positions.

In witness whereof I affix my signature.

ALBERT FURRER.